April 30, 1968  K. B. WELCH  3,381,115
ELECTRICALLY HEATED CONTAINER
Filed March 24, 1965  2 Sheets-Sheet 1
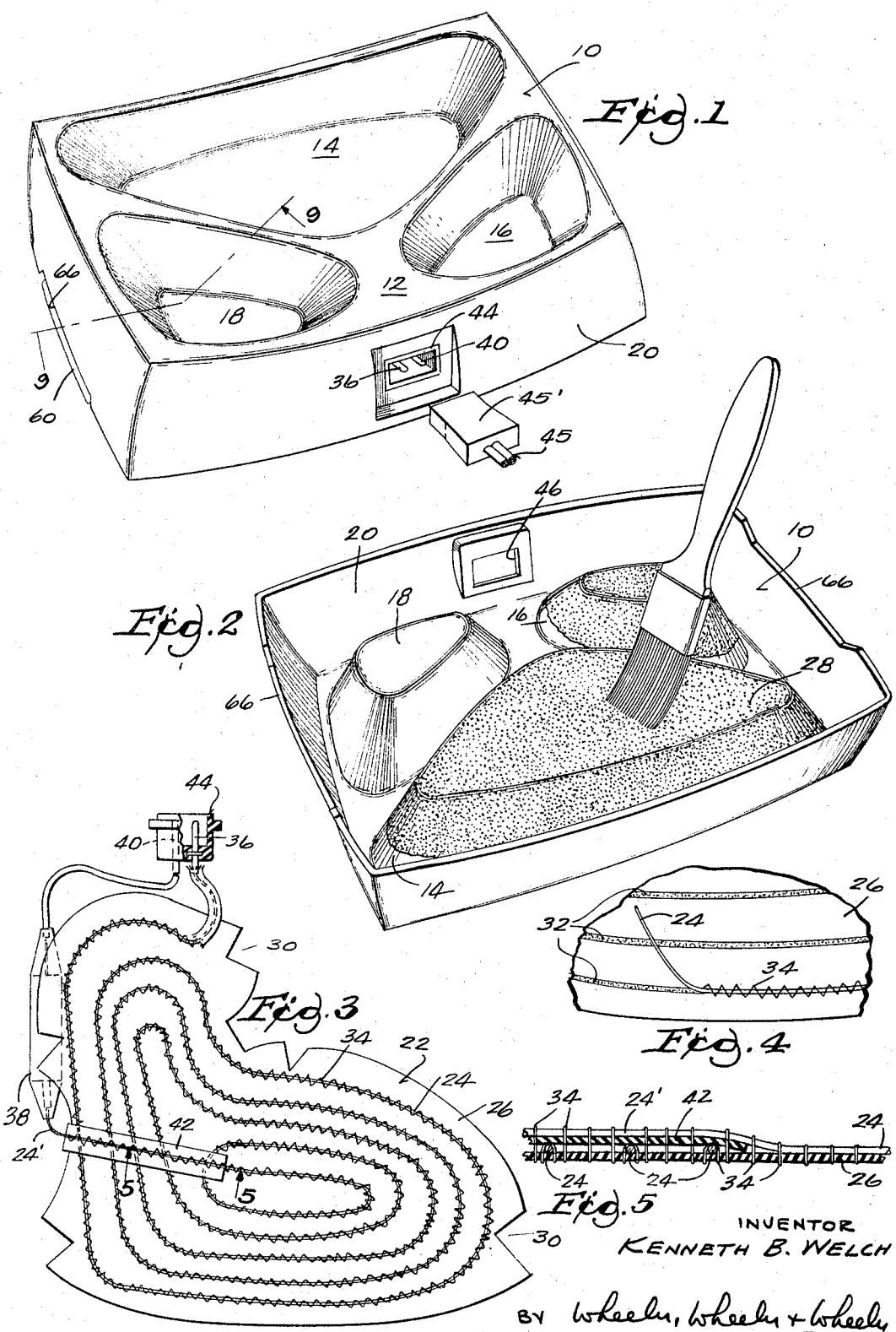

April 30, 1968
K. B. WELCH
3,381,115
ELECTRICALLY HEATED CONTAINER
Filed March 24, 1965
2 Sheets-Sheet 2
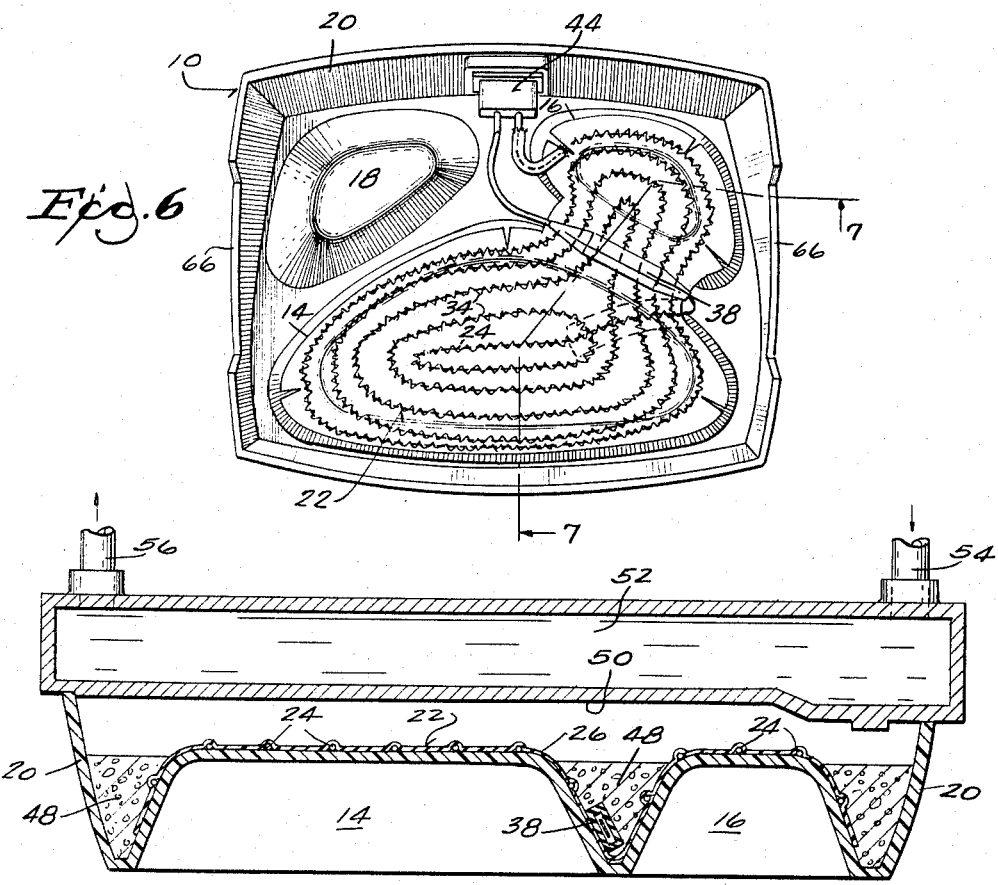
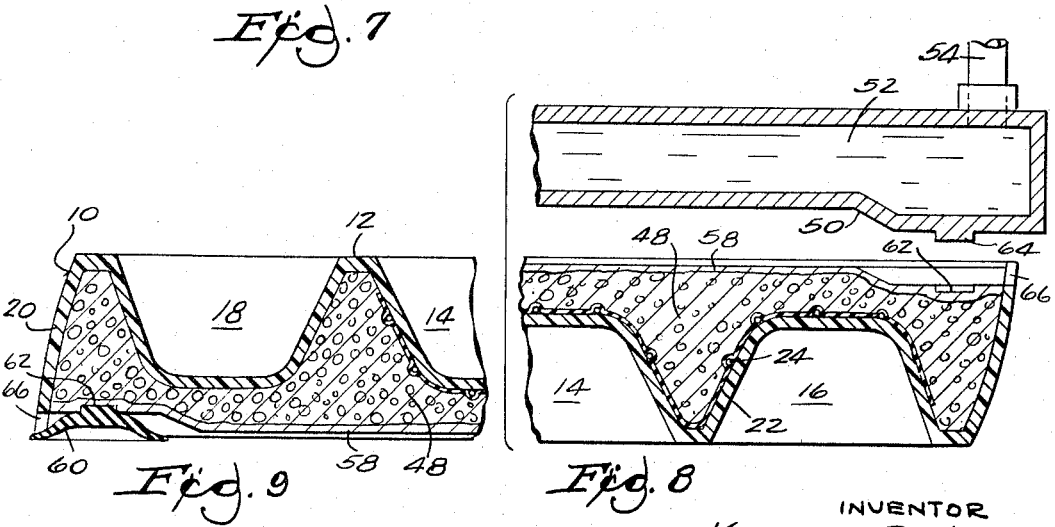
INVENTOR
KENNETH B. WELCH
BY Wheeler, Wheeler & Wheeler
ATTORNEYS

3,381,115
ELECTRICALLY HEATED CONTAINER
Kenneth B. Welch, West Bend, Wis., assignor to Kenro Corporation, Fredonia, Wis., a corporation of Wisconsin
Filed Mar. 24, 1965, Ser. No. 442,332
5 Claims. (Cl. 219—441)

ABSTRACT OF THE DISCLOSURE

A molded plastic container, integrally including a skirt and one or more receptacles with downwardly convex walls depending into the cavity enclosed by the skirt, has adherently connected to at least one such receptacle wall a prefabricated carrier and electrical resistance wire which is molded about the wall to which it adheres and enclosed in an insulating body of foamed plastic resin filling said cavity.

---

Particulars of the invention given herein relate to the embodiment selected to illustrate the preferred practice thereof and are to be regarded as stated by way of example and not by way of limitation.

A container embodying the invention is preferably made entirely of synthetic resin in which the heating element is embedded or sealed so that no metallic surfaces are exposed, to or through which electric current can leak to occasion injury. The preferred material used to make the container is a molding compound which includes fillers, catalysts, curing agents as well as melamine formaldehyde. The invention has several aspects, one of which is concerned with the fact that the electrical resistor which provides the heat is embedded in, or sealed directly to, a wall of the container.

In a preferred embodiment, the molding compound is molded to form a food container in which a pocketed top wall serves as the food receptacle and is provided with an encircling skirt. The resistor is embedded in the under surface of a top wall portion which forms the pocket for the food to be heated. The hollow within the skirt beneath the pocketed top wall is desirably filled with foamed synthetic resin which provides a sealed enclosure about the heating element and thermally and electrically insulates both the heating element and the pocket which is to be heated.

It is possible to have a single unitary container with both heated and unheated pockets, the thermal conductivity of the foamed resin and the melamine being sufficiently low so that food can be kept very warm in one pocket while food in another pocket an inch or two away will remain cold.

In the preferred method of manufacture, the premolded container is inverted and a prefabricated highly pliable heating element is intimately associated with the lower surface of the top wall about any pocket to be heated. An electrically and thermally insulating synthetic resinous material is then applied about the heating element and the under surfaces of the pocketed wall. As it sets, it becomes bonded to the wall and embeds the heating element and becomes a unitary part of the wall. The cavity beneath the wall and within the skirt is then filled with foamed resin which serves not only to provide a bottom for the container but also to completely seal all of the electrical components within it so that no metal other than prongs for an extension cord will be exposed.

In the drawings:

FIG. 1 is a view in perspective of an embodiment representative of the invention.

FIG. 2 is a view in perspective showing in inverted position the molded receptacle as it appears during the application of cement to the wall to which the heating element is to be applied.

FIG. 3 is a plan view of the prefabricated heating element.

FIG. 4 is a fragmentary detail view diagrammatically illustrating the procedure of fabricating the heating element.

FIG. 5 is an enlarged fragmentary detail view taken in section on the line 5—5 of FIG. 3.

FIG. 6 is a bottom plan view of the receptacle after the prefabricated heating element has been attached thereto.

FIG. 7 is a diagrammatic view showing a step in the embedding of the heating element in the cavity of the inverted receptacle, the latter being shown in enlarged cross section taken on the line 7—7 of FIG. 6.

FIG. 8 is a fragmentary detail view diagrammatically showing a further step in the embedding of the resistance element, the section in which the inverted container is shown being comparable to that of FIG. 7 and a chill plate being shown in a position separated from the container.

FIG. 9 is a fragmentary detail view taken in section through the completed receptacle on the line 9—9 of FIG. 1.

The invention contemplates that the electrical resistance wire to be used in heating the wall of the receptacle is embedded directly in said wall. As disclosed herein, one way of accomplishing this is to bond the wire to a prefabricated plastic wall by a compatible material which becomes a unitary part of the wall whereby the heating element is actually in the wall to be heated. The following disclosure concerns one particular way in which it is convenient to accomplish this result.

The basic melamine receptacle 10 is molded to provide the top wall 12 and pockets 14, 16, 18 and the skirt or side wall 20 in one piece. A flexible heating element 22 which is a separate article of manufacture (FIG. 3) may be prefabricated by stitching Nichrome or similar resistance wire 24 onto a highly pliable carrier sheet 26. One carrier I have used successfully is asbestos, with fiberglass impregnation. The carrier 26 must not only be highly flexible but must be contoured marginally, as at 30, in such a manner that it may be molded or conformed to the bottom face 28 of a molded pocket which is to be heated to facilitate its application to the pocket. The wire can be applied according to a predetermined pattern preferably marked on the carrier as by a printed line 32 (FIG. 4).

As the wire is laid on the carrier to follow the pattern, it is anchored thereto. This can be done conveniently by stitching 34 applied with a conventional zigzag sewing machine. One end of the wire 24 is connected to a prong 36 in a generally conventional electric connector plug, and the other is connected through a thermostatic circuit breaker 38 with the other prong 40 of the plug. As shown, the circuit breaker 38 is preferably wrapped, as with asbestos tape, such as to be embedded in foamed insulating plastic as hereinafter described.

The pattern on which the resistance wire is stitched to the pliable carrier preferably extends from circuit breaker 38 circuitously around and around the carrier from the outside margin toward the center (FIG. 3). Thereupon it is necessary to carry the wire across a number of convolutions of the wire previously stitched to the carrier. This can conveniently be done by laying a folded strip 42 of asbestos or the like across the previous convolutions to cover the wire already stitched in place and then extending the end portion 24' of the resistance wire across the bridge thus formed, stitching it as before (FIGS. 3 and 5). The bridge strip 42 may be a piece of the material 26 and it insulates the terminal lead portion 24' of the wire from those portions already attached.

The bottom of the pocket in the inverted mold is then coated with an appropriate cement. In order to achieve a resinous bond which in effect not merely attaches the resistance element to the bottom surface of the wall to be heated, but actually embeds the resistance element in compatible material which becomes a unitary part of such wall, it is preferred to use a synthetic resin which bonds itself to the material of the wall. I have used epoxy cement, urethane cement, phenolic cement, and vinyl cement.

The prefabricated heating element 22 consisting of carrier 26 and resistance wire 24 is then pressed firmly upon the adhesive-coated pocket or pockets with the resistance wire 24 against the wall, being inverted from the position shown in FIG. 3. The pressing of the inverted heating element 22 against the lower surface of the wall which forms the pocket 28 is illustrated diagrammatically in FIG. 6. The prefabricated heating element 22 is then smoothed to conform it to the wall and eliminate all entrapped air and to press the resistance wire into the coating of synthetic resin on the wall to be heated. Elimination of trapped air is very important to prevent explosive expansion when heat is applied.

The plug 44 of the prefabricated heating element is then inserted in the appropriate opening 46 in a portion of skirt 20 of the molded container 10 and the thermostat or circuit breaker 38 is preferably placed directly against the under surface of the carrier 26 of the heating element 22 which envelops one of the pockets. If two pockets are heated, the circuit breaker can appropriately be placed between them. The pattern of the prefabricated heating element 22 is specifically designed to be applicable to the lower surface of wall portions of pockets 14 and 16 and to exclude the lower face of pocket 18 (FIGS. 2, 6 and 9).

After the assembly of the heating element or heating elements to the pocket under-surfaces, the entire cavity within top wall 12 and within the skirt 20 is filled with synthetic resin preferably of a type which is foamed for maximum thermal insulation. I prefer to use urethane foam for the filler which completes the embedding of the resistance element in the product and seals the cavity to provide a bottom for the finished container.

It is broadly immaterial whether the foamable material is introduced in one step or more than one. However, it has been found desirable to introduce the foamable material in successive layers. For example, a first layer 48 of urethane foam is introduced into the inverted container to partially fill the hollow around the pockets and within the skirt as shown in FIG. 7. After the material of this layer 48 has completed its foaming expansion, a second layer of foamable urethane material is placed upon the first layer.

Whether the material is deposited in one layer or more, a jig 50 which is also a chill is applied onto the margin of the skirt to confine the urethane as it expands due to foaming. The jig 50 is a chill only in a relative sense, since it actually has been used at a temperature of about 115° F. in practice. Without this temperature, the material does not flow properly. It desirably has a release coating such as "Teflon" to prevent adhesion. Ordinarily, the high thermal conductivity of the steel used for jig 50 is sufficient to enable it to function as a chill without artificial cooling. However, to stress diagrammatically this function of jig 50, I have shown in FIG. 7, a jig which has an interior cavity at 52 through which a temperature controlling fluid may be circulated between the pipes 54 and 56. The use of a temperature controlled jig materially cooler than the foam causes the surface of the urethane foam to form a very dense and smooth external skin 58 which will constitute the bottom of the completed container. As shown, this skin is spaced a fraction of an inch above the level of the lower margin of the skirt.

The prongs 36 and 40 of the plug member 44 to which an electrical extension cord 45 may be connected constitute the only metal which is visible or exposed at any time. In service, these will, of course, be enclosed within the socket terminal 45' of the extension cord so that in use no metal is exposed.

The entire container is sealed and gives the appearance of, and has the electrically insulative effect of, one integral molding of plastic. The foam mass 48 and the heavy skin 58 produced by the chill 58 extend from one side of the skirt to the other. The foam completely adheres to and seals all interior surfaces that would otherwise be exposed beneath the pre-molded plastic receptacle. It not only holds the plug member in place within the skirt but provides a complete plug member so that no moisture can enter. The electrical resistance wire is completely enveloped and the insulating quality of the foam is such that no discernible leakage currents can penetrate to the outside. In practice, the wire is .005 inch in diameter and has a total resistance such that it draws 75 watts of current. The figures are, of course, merely examples. In practice, a wide variety of dimensions and wattage are expected to be used.

When the container is otherwise complete, it preferably has a pair of vacuum cups 60 attached to its bottom if it is to be used as a child's dish. Sockets 62 may be formed in the foam material for this purpose if the chill jig 50 is provided with bosses 64 which are appropriately located. When this is done, the vacuum cups are preferably cemented in place in the recesses 62, which are desirably proximate shallow notches 66 in the skirt. If the skirt 20 is to have the shallow notches at 66, the chill jig will of course, be appropriately formed to fit because the jig must desirably provide a complete closure for the cavity enclosed by the side wall 20 of the inverted receptacle. Otherwise, foam would not be confined to produce the smooth, hard skin which constitutes the bottom of the finished receptacle. The purpose of these notches is to afford access to the side margins of the respective vacuum cups so that the operator can readily break the vacuum when it is desired to pick up the receptacle.

Having disclosed the best construction and mode of manufacture known to me, I claim:

1. A molded receptacle comprising a wall portion of synthetic plastic having a plurality of cavities to receive material, in one of which cavities such material is to be heated, the under surfaces of the respective cavities being downwardly convex, an integral marginal skirt encircling said wall portion and within which such cavities are disposed, said skirt defining a hollow into which depend the wall portions forming said cavities, an electrical resistor extending about the downwardly convex wall portion of at least one of said cavities, terminal means for supplying the resistor with current, a flexible carrier upon which the said resistor is mounted and which conforms substantially to the whole of the downwardly convex under surface of said one cavity, means including a layer of a synthetic resin compatible with the plastic from which the receptacle wall is made for bonding the resistor and carrier to the downwardly convex wall portion about which the resistor extends, said resistor and flexible carrier being substantially embedded in said layer of resin so it forms a unitary structure with said wall portion, and thermal insulation material filling the hollow about the cavity for material to be heated and within said skirt.

2. A combination according to claim 1 in which said thermal insulating material comprises a foamed synthetic resin substantially filling the entire hollow within said skirt whereby to imbed and seal said hollow and to provide electrical as well as thermal insulation for the resistor.

3. A combination according to claim 2 in which the foamed synthetic resin is provided with a skin underlying all portions of the foamed synthetic resin and closing the marginal skirt at its bottom beneath said cavities and said resistor.

4. A receptacle according to claim 1 in which the said resistor extends about the wall of one of said cavities to the exclusion of another, said insulation material being disposed between the resistor and said other cavity.

5. A receptacle according to claim 1 in which a thermostat connected in series with the resistor is assembled with the carrier.

References Cited
UNITED STATES PATENTS

| | | | |
|---|---|---|---|
| 1,257,599 | 2/1918 | Hadaway | 219—436 |
| 1,378,474 | 5/1921 | Lidberg | 219—521 |
| 1,924,699 | 8/1933 | Smith | 219—436 |
| 2,436,097 | 2/1948 | Clarke | 206—4 |
| 2,783,357 | 2/1957 | Readey | 219—436 |
| 2,971,077 | 2/1961 | Palmer | 219—436 |
| 3,038,058 | 6/1962 | Gordon. | |
| 3,043,943 | 7/1962 | Moot | 219—460 |
| 3,070,253 | 12/1962 | Brown | 220—9 |
| 3,122,265 | 2/1964 | Innis | 206—4 |
| 2,035,147 | 3/1936 | Dennis | 219—436 X |
| 2,194,193 | 3/1940 | Barnes | 219—536 |
| 3,191,004 | 6/1965 | Hocker | 219—438 X |
| 3,231,718 | 1/1966 | Vasile | 219—385 X |

FOREIGN PATENTS

| | | |
|---|---|---|
| 639,835 | 3/1947 | Great Britain. |
| 743,322 | 1/1956 | Great Britain. |
| 150,673 | 9/1921 | Great Britain. |

ANTHONY BARTIS, *Primary Examiner.*